(12) United States Patent
Chen et al.

(10) Patent No.: US 8,022,670 B2
(45) Date of Patent: Sep. 20, 2011

(54) METHOD FOR CHARGING BATTERY MODULE

(75) Inventors: Chia-Chang Chen, Taipei (TW); Chih-Tarng Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 1085 days.

(21) Appl. No.: 11/830,850

(22) Filed: Jul. 31, 2007

(65) Prior Publication Data

US 2008/0169786 A1 Jul. 17, 2008

(30) Foreign Application Priority Data

Jan. 11, 2007 (TW) .............................. 96101093 A

(51) Int. Cl.
*H02J 7/00* (2006.01)
*H02J 7/04* (2006.01)

(52) U.S. Cl. ..................... 320/126; 320/139; 320/160

(58) Field of Classification Search .................. 320/126, 320/139, 160, 162–164
See application file for complete search history.

(56) References Cited

U.S. PATENT DOCUMENTS 6,975,094 B1 12/2005 Lascaud et al.
7,518,338 B2 * 4/2009 Wang et al. ................... 320/125

FOREIGN PATENT DOCUMENTS

| CN | 1881734 | 12/2006 |
|---|---|---|
| JP | 09-084275 | 3/1997 |
| TW | 250713 | 3/2006 |

OTHER PUBLICATIONS

"1st Office Action of China counterpart application", issued on Aug. 7, 2009, p. 1-p. 8.

* cited by examiner

*Primary Examiner* — Richard V Muralidar
(74) *Attorney, Agent, or Firm* — Jianq Chyun IP Office

(57) ABSTRACT

A method for charging a battery module including a plurality of parallel-connected battery core sets is provided. In the present method, a constant charging current is provided for charging the battery module first. Then, the voltage of each parallel-connected battery core set in the battery module is determined whether reaches a nominal voltage. If it reaches the nominal voltage, the charging current or charging voltage applied to the battery module is adjusted for charging the parallel-connected battery core set having the maximum voltage with a constant voltage. Finally, it is determined whether the electric power of the battery module is fulfilled. If not yet fulfilled, a constant voltage is continuously supplied to the battery module for charging until the electric power of the battery module is full. Accordingly, the present invention can charge the battery more quickly with taking the safety of the battery into account.

9 Claims, 4 Drawing Sheets

METHOD FOR CHARGING BATTERY MODULE

CROSS-REFERENCE TO RELATED APPLICATION

This application claims the priority benefit of Taiwan application serial no. 96101093, filed Jan. 11, 2007. All disclosure of the Taiwan application is incorporated herein by reference.

BACKGROUND OF THE INVENTION

1. Field of the Invention

The present invention relates to a charging method. More particularly, the present invention relates to a method for charging a battery module.

2. Description of Related Art

Along with increasing improvement of performance of processors, application programs, and drawing function, the electric power required by portable computers is gradually increased. In order to make the batteries reach the electric power requirement during the operation of the portable computers, usually the battery is designed to assemble a plurality of parallel-connected battery core sets in a battery module through serial connection, thereby gathering enough electric power for the portable computers.

With the increment of battery capacity, how to quickly and safely charge batteries has become an important issue for the manufacturers. Due to the special design of the battery module, the electric power varies at different time points or in different charging environments, so many corresponding charging methods are developed directed to the characteristics of the battery module.

In ROC patent No. 250,713, a power source management circuit is provided for controlling charging parameters supplied to a battery. FIG. 1 is a block diagram of a conventional power source management circuit. As shown in the figure, the power management circuit 100 includes a power control circuit 110, a control signal generating circuit 120, and a current control circuit 130. The power control circuit 110 is used to supply a power control signal representing the output power level of the DC power source, and the control signal generating circuit 120 reduces the charging parameters supplied to the battery when the power output level exceeds a predetermined power threshold level. In addition, the current control circuit 130 supplies a current control signal representing the output level of the DC power source current. The control signal generating circuit 120 further compares the current control signal with the current threshold signal representing the current threshold level. When the current output level exceeds the current threshold level, the control signal generating circuit 120 further reduces the charging parameters supplied to the battery. It is known from the above that in the conventional art, when the electric power variation during the charging of the battery reaches a current threshold level, the electric power supplied to the battery charging is decreased.

FIG. 2 is a schematic view of a conventional battery charging state. Referring to FIG. 2, the charging method can be divided into two stages. In the first stage ($t=0-t_1$), a constant current charging is adopted, and a charging curve 210 represents the variation of voltage $V_{PC}$ of the battery module. When the voltage $V_{PC}$ of the battery module reaches a voltage $V_{inc}$ supplied by the charger, a second stage is entered ($t=t_1-t_2$), and a constant voltage charging is used instead until the battery module is full ($t=t_2$). In the method, the overall voltage of the battery module is charged, and the charging voltage supplied to each of the parallel-connected battery core sets cannot be adjusted according to the charging state thereof, such that the battery module may still be charged even when the voltage of the parallel-connected battery core set exceeds a safety value. Thus, not only the life of the parallel-connected battery core set is reduced, but also the battery is in danger of being overcharged.

FIG. 3 is a schematic view of a conventional battery charging state. Referring to FIG. 3, the difference from the previous method is that in the charging method, the voltage of each parallel-connected battery core set in the battery module is respectively measured, and the charging type of the overall battery module is adjusted according to the maximum value of the measured voltage. More particularly, in the first stage ($t=0-t_1$) of this method, a constant current charging is also adopted, in which a curve 310 represents the variation of the maximum voltage $V_{emax}$ of each parallel-connected battery core set in the battery module, and a curve 320 represents the variation of the minimum voltage $V_{emin}$ of each parallel-connected battery core set in the battery module. When the voltage $V_{emax}$ of the parallel-connected battery core set reaches a nominal voltage $V_{cof}$ endured by the parallel-connected battery core set, the electric power supplied by the charger is turned off. Here, the voltage $V_{emax}$ of the parallel-connected battery core set starts to decrease. Until the voltage $V_{emax}$ of the parallel-connected battery core set decreases to a voltage lower limit $V_{con}$ of the parallel-connected battery core set, the electric power supplied by the charger is turned on to increase the voltage $V_{emax}$ of the parallel-connected battery core set. When the voltage $V_{emax}$ of the parallel-connected battery core set reaches a nominal voltage $V_{cof}$, the power supply is turned off. The charger is opened and closed repeatedly until all the parallel-connected battery core sets of the battery module are full. In a second stage ($t=t_1-t_2$), the magnitude of the charging current is determined according to the variation of the minimum voltage $V_{emin}$ of each parallel-connected battery core set in the battery module. When the minimum voltage $V_{emin}$ of the parallel-connected battery core set exceeds a voltage $V_{incc}$ supplied from the charger to the parallel-connected battery core set, the second stage is entered, and the magnitude of the charging current is reduced gradually. Similarly, with the variation of the voltage $V_{emax}$ of the parallel-connected battery core set, the power is discontinuously supplied until the battery is full ($t=t_2$). By adopting the above method, although a single parallel-connected battery core set can be prevented from being overcharged, it takes a long time to fulfill the electric power of the battery module with the discontinuous supply of the power source, and the frequent charging and discharging of the battery may shorten the service life of the battery, which is not the optimal charging method.

SUMMARY OF THE INVENTION

Accordingly, the present invention is directed to a method for charging a battery module, in which the voltage variation of each parallel-connected battery core set in the battery module is measured for appropriately adjusting a charging current when the voltage of the parallel-connected battery core set reaches a safety value, so as to achieve the function of protecting the parallel-connected battery core set.

The present invention is also directed to a method for charging the battery module, in which the voltage variation of each parallel-connected battery core set in the battery module is measured for appropriately adjusting a charging voltage when the voltage of the parallel-connected battery core set reaches a safety value, so as to achieve the function of protecting the parallel-connected battery core set.

In order to achieve the above or other objectives, the present invention provides a method for charging the battery module including a plurality of parallel-connected battery core sets. The method includes following steps. a. a charging current applied to the battery module is adjusted to charge the battery module with a constant current; b. the voltage of each parallel-connected battery core set in the battery module is determined whether reaches a nominal voltage; c. if the voltage of one of the parallel-connected battery core sets reaches the nominal voltage, the charging current applied to the battery module is adjusted to charge the parallel-connected battery core set having a maximum voltage with a constant voltage; d. whether the electric power of the battery module is fulfilled is determined; and e. if the electric power of the battery module is not fulfilled, the parallel-connected battery core set having the maximum voltage is charged continuously with the constant voltage until the electric power of the battery module is full.

In the method for charging the battery module according to an embodiment of the present invention, before the step of adjusting the charging current applied to the battery module to charge the battery module with a constant current, a trickle charge is first performed on the battery module, and the voltage of the battery module is determined whether reaches a charge initial voltage. The battery module is charged with a constant current when the voltage of the battery module reaches a charge initial voltage.

In the method for charging the battery module according to an embodiment of the present invention, the step of adjusting the charging current applied to the battery module to charge the battery module with a constant current includes firstly reducing the charging current supplied to the battery module by a level, determining whether the voltage of each parallel-connected battery core set in the battery module reaches the nominal voltage, and reducing the charging current supplied to the battery module by a level when the voltage of one of the parallel-connected battery core sets is determined to reach the nominal voltage. Finally, the above steps are repeated until the battery module is full.

The present invention further provides a method for charging a battery module including a plurality of parallel-connected battery core sets. The method includes following steps. a. the charging voltage applied to the battery module is adjusted to charge the battery module with a constant current; b. the voltage of each parallel-connected battery core set in the battery module is determined whether reaches a nominal voltage; c. if the voltage of one of the parallel-connected battery core sets reaches the nominal voltage, the charging voltage applied to the battery module is adjusted to charge the parallel-connected battery core set having the maximum voltage with a constant voltage; d. whether the electric power of the battery module is fulfilled is determined; and e. if the electric power of the battery module is not fulfilled, the parallel-connected battery core set having the maximum voltage is charged continuously with the constant voltage until the electric power of the battery module is full.

In the method for charging the battery module according to an embodiment of the present invention, before the step of adjusting the charging voltage applied to the battery module to charge the battery module with a constant current, a trickle charge is firstly performed on the battery module, and the voltage of the battery module is determined whether reaches a charge initial voltage. The battery module is charged with the constant current when the voltage of the battery module reaches a charge initial voltage.

In the method for charging the battery module according to an embodiment of the present invention, the step of adjusting the charging voltage applied to the battery module to charge the battery module with a constant current includes reducing the charging voltage supplied to the battery module by a level, determining whether the voltage of each parallel-connected battery core set in the battery module reaches the nominal voltage, and reducing the charging current supplied to the battery module by a level again when the voltage of one of the parallel-connected battery core sets is determined to reach the nominal voltage. Finally, the above steps are repeated until the battery module is full.

In the method for charging the battery module according to an embodiment of the present invention, in the step of determining whether the voltage of each parallel-connected battery core set of the battery module reaches the nominal voltage, if the voltage of the parallel-connected battery core sets does not reach the nominal voltage, the constant current charging is continuously performed on the battery module.

In the method for charging the battery module according to an embodiment of the present invention, the nominal voltage is a maximum voltage endured by the parallel-connected battery core set during the safe operation.

In the method for charging the battery module according to an embodiment of the present invention, the method of determining whether the electric power of the battery module is fulfilled includes firstly determining whether the current passing through the battery module is smaller than a minimum current, if the current passing through the battery module is smaller than the minimum current, determining the electric power of the battery module is fulfilled; or, if the current passing through the battery module is greater than the minimum current, determining the electric power of the battery module is not fulfilled.

In the present invention, a structure of voltage control or current control is adopted, a constant current charging is maintained at the beginning of charging the battery module, and when the voltage of certain parallel-connected battery core set in the battery module reaches a safety value, a constant voltage charging is used instead, so as to quickly increase the electric power of the battery with taking the safety of the battery into account.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Commonly, apparatuses such as notebook computers having large electric power consumption use a battery module with a plurality of parallel-connected battery core sets connected in series, so as to obtain the sufficient electric power to operate. However, the battery module includes a plurality of parallel-connected battery core sets, and after a long term of using, the capacity or the charging and discharging states of the parallel-connected battery core sets are changed. And at that time, the states of the parallel-connected battery core sets cannot be the same, and it is not suitable to charge and discharge based on the initial settings.

Accordingly, in order to avoid the overcharging of the battery module in the course of charging, an intelligent battery module has been developed. The intelligent battery module can monitor the voltage value of each parallel-connected battery core set in the battery module, so as to adjust the charging current or the voltage supplied to the battery module. The present invention is a method for charging the battery module which is developed by adopting the intelligent battery module and combining the consideration of safety and charging efficiency. In order to make the content of the present invention be apparent, embodiments are given below for the implementation of the present invention.

Figure 1:
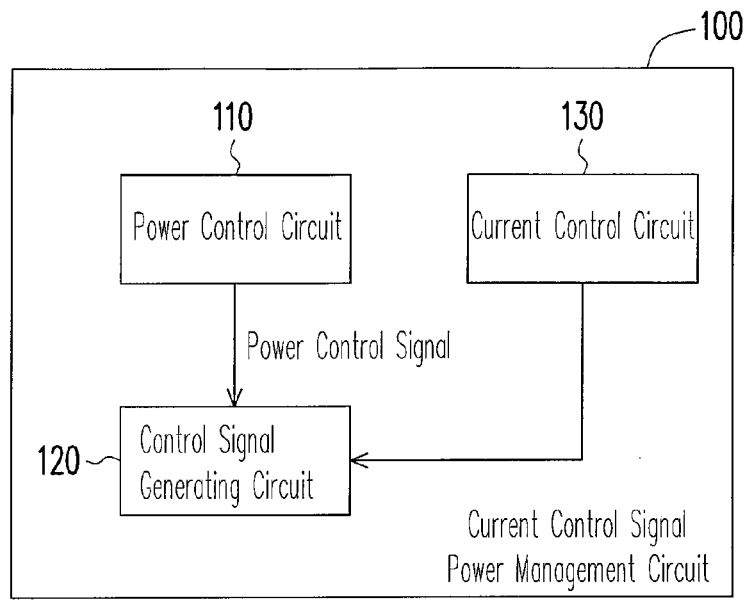
FIG. 1 is a block diagram of a conventional power source management circuit.
Figure 2:
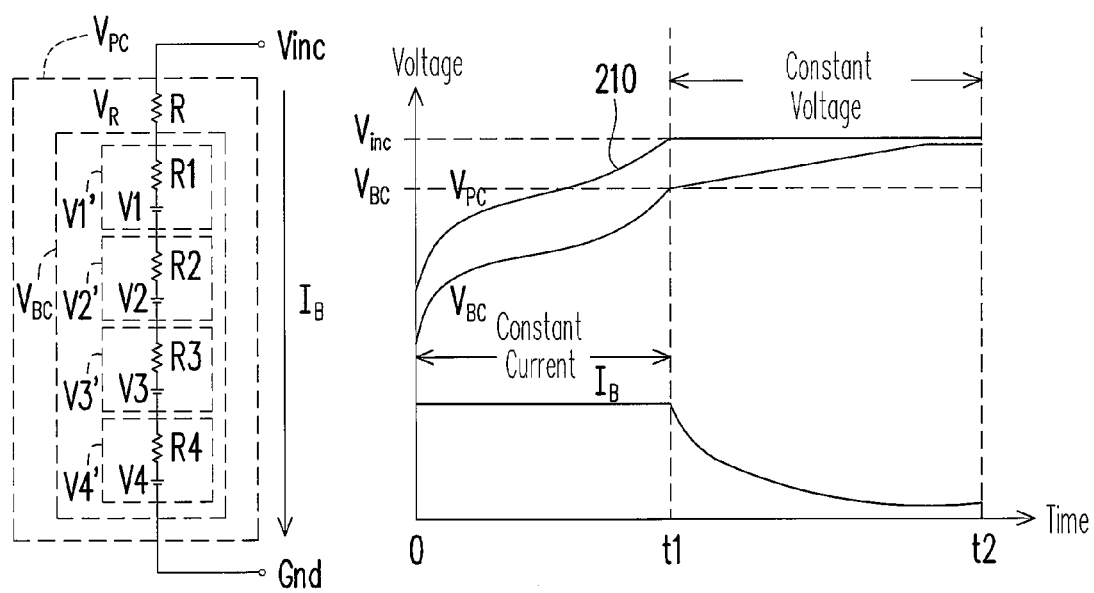
FIG. 2 is a schematic view of a conventional battery charging state.
Figure 3:
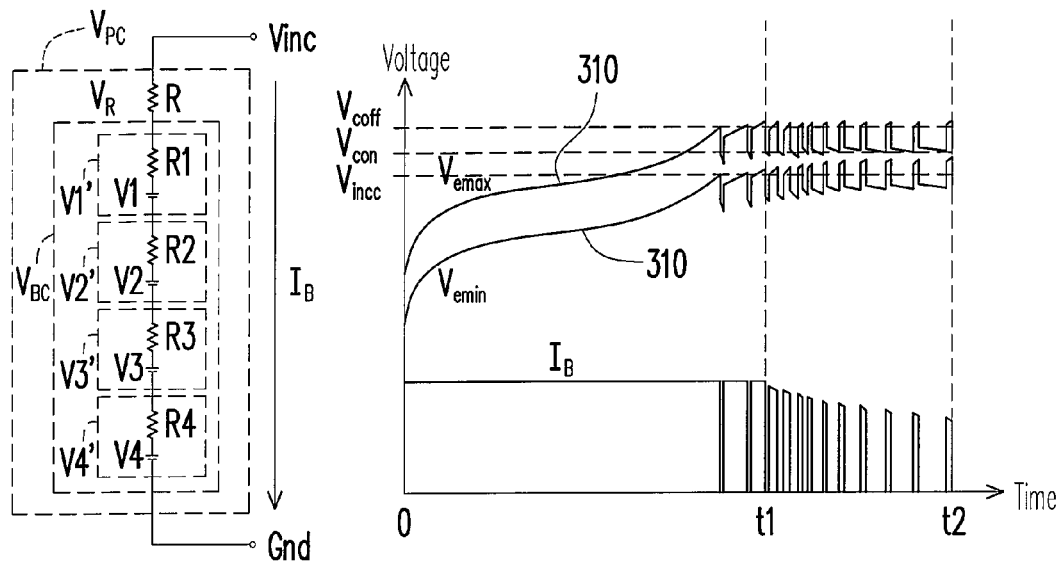
FIG. 3 is a schematic view of a conventional battery charging state.
Figure 4:
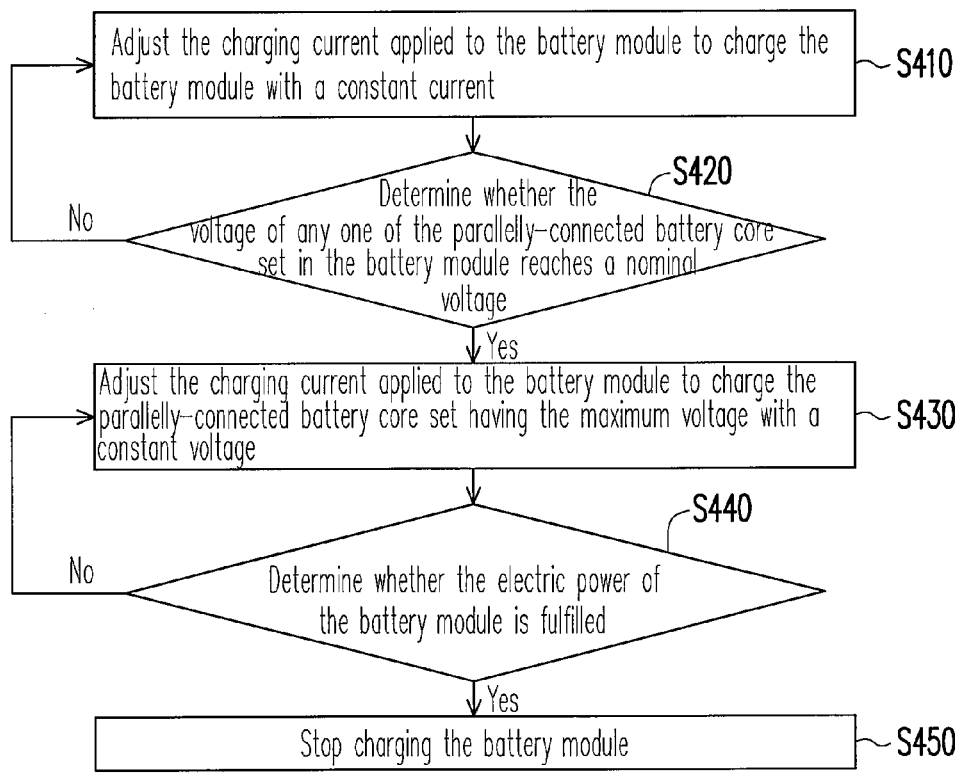
FIG. 4 is a flow chart of a method for charging the battery module according to an embodiment of the present invention.

FIG. 4 is a flow chart of a method for charging the battery module according to an embodiment of the present invention. Referring to FIG. 4, in this embodiment, a method of controlling a charging current is used to charge a battery module having a plurality of parallel-connected battery core sets. Under the circumstance of meeting the safety requirement, the charging voltage and the current applied to the battery module are increased to shorten the time for charging. Each parallel-connected battery core set has one or more cells connected in parallel, so as to store sufficient electric power.

Figure 5:
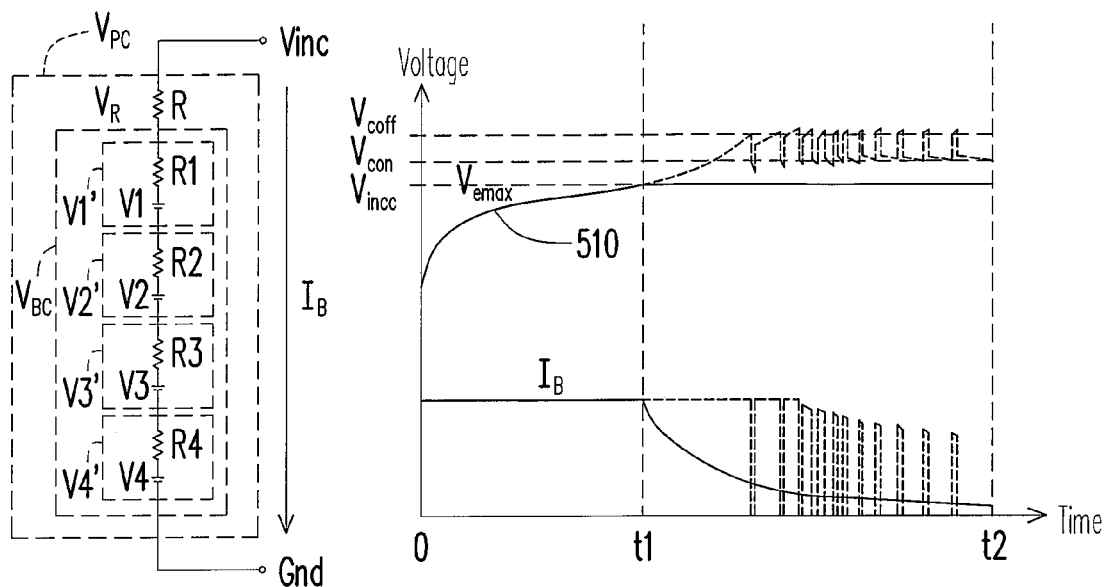
FIG. 5 is a charging curve diagram of the battery module according to the embodiment of the present invention.

FIG. 5 is a charging curve diagram of the battery module according to the embodiment of the present invention. Referring to FIGS. 4 and 5, in this embodiment, in a first stage ($t=0-t_1$) of the charging, the charging current applied to the battery module is first adjusted to charge the battery module with a constant current (step S410). Here, the charging current is, for example, a fixed current supplied by a charger, and usually the voltage of the charger is also fixed. The voltage of each parallel-connected battery core set of the battery module gradually produces a voltage curve 510 varying with the time as shown in FIG. 5 along with the increment of the received current. Here, the voltage curve 510 represents the curve of the maximum voltage $V_{emax}$ among the parallel-connected battery core sets.

Next, it is determined whether the voltage of any one of the parallel-connected battery core sets in the battery module reaches a nominal voltage (step S420). The nominal voltage represents a maximum voltage endured by a parallel-connected battery core set during the safe operation, so as to limit the voltage of a single parallel-connected battery core set. In this embodiment, the voltage of the parallel-connected battery core set is limited in a range of nominal voltage, so as to charge the battery module with the guarantee of the safety of each parallel-connected battery core set.

Returning to step S420, if the voltage of any parallel-connected battery core set reaches the above nominal voltage, it represents that the charging voltage applied to the battery module reaches an upper limit endured by a certain parallel-connected battery core set. Here, in order to guarantee the safety of the parallel-connected battery core set, in this embodiment, a second stage ($t=t_1-t_2$) of charging is entered, and the original constant current charging is changed to a constant voltage charging (step S430).

In order to prevent the voltage of each parallel-connected battery core set in the battery module from exceeding the nominal voltage, in this embodiment, the charging current applied to the battery module is adjusted to charge the parallel-connected battery core set having the maximum voltage with the constant voltage which is the nominal voltage of the parallel-connected battery core set.

Finally, it is determined whether the electric power of the battery module is fulfilled (step S440). The method of determining whether the electric power of the battery module is fulfilled includes determining whether the current passing through the battery module is smaller than a minimum current value. If yes, it represents that the electric power of the battery module approaches to be fulfilled, such that the required current value becomes smaller gradually with the supply of the same voltage. Now, it is determined that the electric power of the battery module is fulfilled, and the charging of the battery module is stopped (step 450). On the contrary, if the current passing through the battery module is greater than the minimum current, it is determined that the electric power of the battery module is not fulfilled, so as to return to step S430 to proceed charging the parallel-connected battery core set with the constant voltage until the electric power of the battery module is fulfilled.

Figure 6:
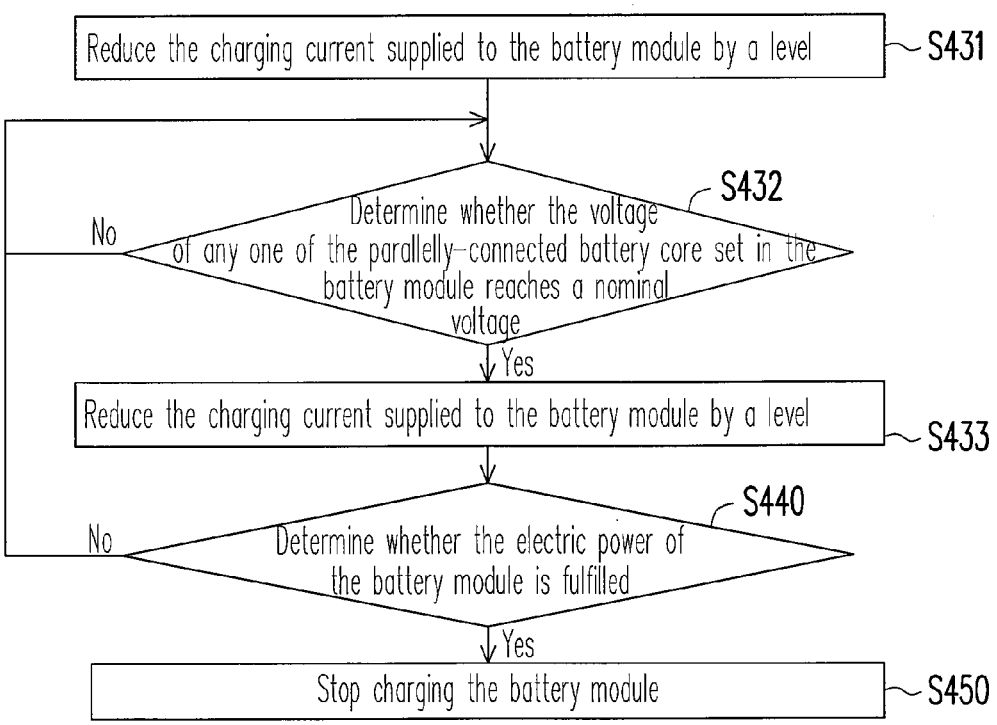
FIG. 6 is a flow chart of a method of adjusting the charging current to maintain the constant voltage charging according to the embodiment of the present invention.

In addition, in another embodiment, how to adjust the charging current to charge the parallel-connected battery core set with the constant voltage is illustrated. FIG. 6 is a flow chart of the method of adjusting the charging current to maintain the constant voltage charging according to the embodiment of the present invention. Referring to FIG. 6, the embodiment is continued after step S430, wherein the charging current is adjusted to charge the parallel-connected battery core set with the constant voltage according to the nominal voltage endured by the parallel-connected battery core set.

In this embodiment, the initial situation is that the voltage of a certain parallel-connected battery core set has reached the nominal voltage. In order to prevent the voltage of the parallel-connected battery core set from exceeding the nominal voltage, in this embodiment, firstly, the charging current supplied to the battery module is reduce by a level (step S431). The level is defined by manufacturers of chargers or users according to practical requirements and situations, and it is not limited in the present invention. In addition, after the charging current is reduced, the charging voltage remains unchanged, but the voltage of the battery module itself is slightly reduced with the decrement of the received charging current. Definitely, the extent of the decrement is also affected by the extent of the decrement of the charging current. In this embodiment, in order to make the charging voltage remain unchanged, the extent of the decrement of the level of charging current is not too large, so as to make the curve of the charging voltage in FIG. 5 remain horizontal.

After the level of charging voltage is reduced, the voltage of the parallel-connected battery core set is slightly reduced, so in the next step of the embodiment, the voltage of each parallel-connected battery core set in the battery module is determined whether reaches the nominal voltage (step S432). Once the nominal voltage is reached, the charging current is reduced by a level again (step S433). Finally, it is determined whether the electric power of the battery module is fulfilled (step S440). If yes, the charging of the battery module is stopped (step S450). Or, if not, the steps of reducing the charging current level and determining the voltage are repeated until the electric power of the battery module is full.

Through the method of controlling the charging current, at the initial stage of charging, the constant current charging is adopted. When the voltage passing through the battery module reaches the nominal voltage, the constant voltage charging is used instead. As compared with the conventional technology (indicated by dashed line in FIG. 5), the present invention can provide sufficient charging current for the battery module with taking the safety of the battery module into account, thus achieving the function of quick charging.

It is noted that in this embodiment, before the step of adjusting the charging current applied to the battery module to charge the battery module with the constant current, a trickle charging is further performed on the battery module, and the voltage of the battery module is determined whether reaches a charge initial voltage. The battery module is started to be charged with the constant current when the voltage of the battery module reaches the charge initial voltage. The reason of adopting the step is that when the large current is used to charge the over-discharged or deeply-discharged battery, it is not easy to restore the electric power of the battery fully. Therefore, when the electric power of the battery is extremely low, it is necessary to adopt the trickle charging method to protect the battery.

In addition to the method of controlling the current to charge the battery module, the present invention further includes using the method of controlling the voltage to charge the battery module, which will be illustrated in detail in an embodiment as follows.

Figure 7:
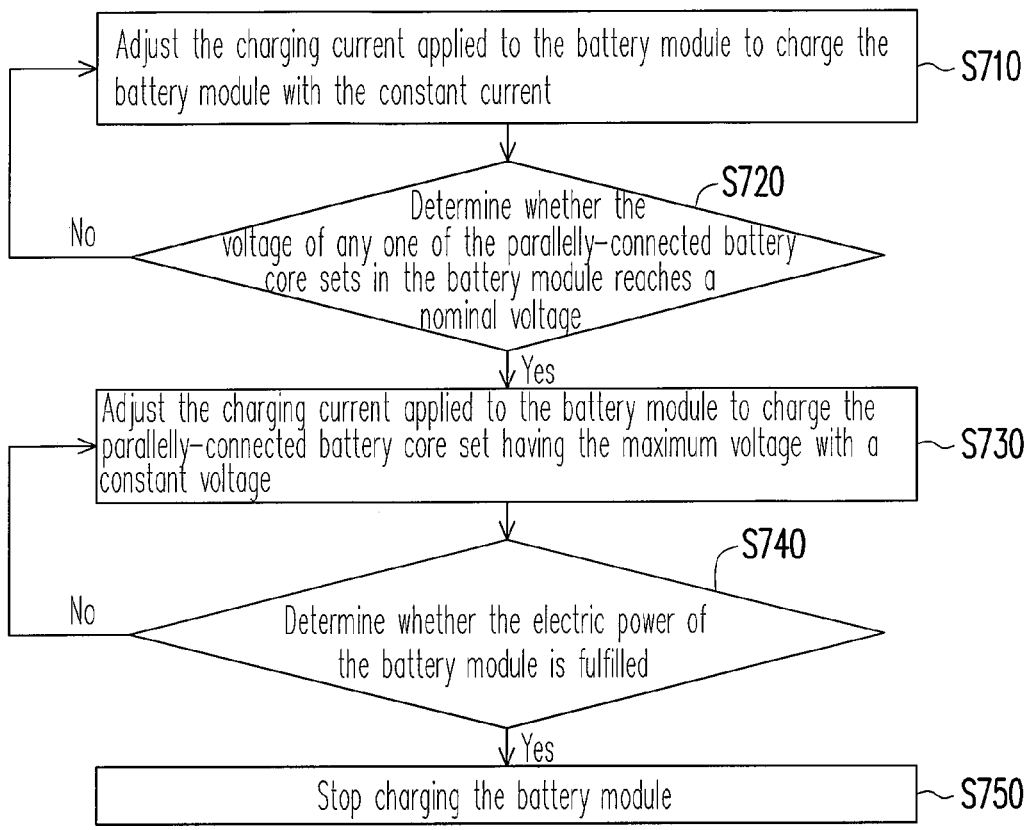
FIG. 7 is a flow chart of a method for charging the battery module according to another embodiment of the present invention.

FIG. 7 is a flow chart of the method for charging the battery module according to another embodiment of the present invention. Referring to FIG. 7, in this embodiment, through the method of controlling the charging voltage, a battery module having a plurality of parallel-connected battery core sets is charged, and the charging voltage and current applied to the battery module is increased in the situation of meeting the safety requirements, so as to shorten the time for charging. Each parallel-connected battery core set, for example, has one or more cells connected in parallel, so as to store sufficient electric power.

Referring to FIGS. 5 and 7, as described in the above embodiment, in this embodiment, the charging method also includes two steps. In the first stage ($t=0-t_1$), firstly the charging voltage applied to the battery module is adjusted to charge the battery module with the constant current (step S710). Here, the charging voltage is supplied by the charger, and the charging current is also fixed. The voltage of the battery module gradually produces a curve 510 varying with the time as shown in FIG. 5 along with the increment of the received current.

Next, the voltage of each parallel-connected battery core set in the battery module is determined whether reaches a nominal voltage (step S720). If the voltage of any one of the parallel-connected battery core sets reaches the nominal voltage, it represents that the charging voltage applied to the battery module reaches an upper limit endured by a certain parallel-connected battery core set. Here, in order to guarantee the safety of the parallel-connected battery core set, in this embodiment, the second stage ($t=t_1-t_2$) of charging is entered, and the original constant current charging is changed to the constant voltage charging (step S730).

In order to prevent the voltage value of each parallel-connected battery core set in the battery module from exceeding the nominal voltage, in this embodiment, the charging voltage applied to the battery module is adjusted to charge the parallel-connected battery core set having the maximum voltage with the constant voltage which is the nominal voltage of the parallel-connected battery core set.

Finally, it is determined whether the electric power of the battery module is fulfilled (step S740). If the current passing through the battery module is reduced gradually and becomes smaller than the minimum current, it is determined that the electric power of the battery module is fulfilled, so as to stop charging the battery module (step 750). On the contrary, if the current passing through the battery module is still larger than the minimum current, it is determined that the electric power of the battery module is not fulfilled, so as to return to step S730 to proceed charging the battery module with the constant voltage until the electric power of the battery module is full.

It is known from the above description that the main difference between this embodiment and the above embodiment is that this embodiment adopts the constant voltage to control the charging current and voltage supplied to the battery module. Another embodiment is given below for illustrating how to adjust the charging voltage to charge the battery module with the constant voltage.

Figure 8:
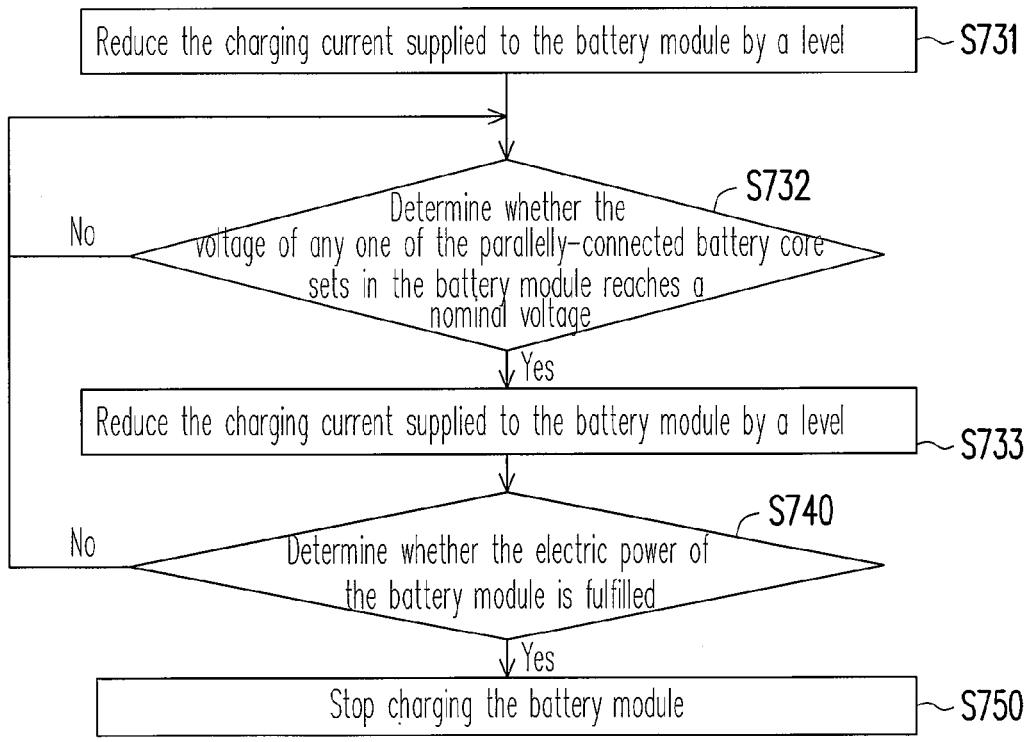
FIG. 8 is a flow chart of a method of adjusting the charging voltage to maintain the constant voltage charging according to the embodiment of the present invention.

FIG. 8 is a flow chart of a method of adjusting the charging voltage to maintain the constant voltage charging according to the embodiment of the present invention. Referring to FIG. 8, this embodiment is continued after step S730, wherein the charging voltage is adjusted to charge the parallel-connected battery core set with the constant voltage according to the nominal voltage endured by the parallel-connected battery core set.

In this embodiment, the initial situation is that the voltage of a certain parallel-connected battery core set has reached the nominal voltage. In order to prevent the voltage of the parallel-connected battery core set from exceeding the nominal voltage, in this embodiment, firstly, the charging voltage supplied to the battery module is reduced by a level (step S731). After the charging current is reduced, the charging voltage remains unchanged, but the voltage of the battery module itself is slightly reduced with the decrement of the received charging current. Definitely, the extent of the decrement is also affected by the decrement of the charging current. In this embodiment, in order to make the charging voltage remain unchanged, the extent of the decrement of the level of the charging current is not too large, so as to make the curve of the charging voltage in FIG. 5 remain horizontal.

After the level of the charging voltage is reduced, the voltage of the parallel-connected battery core set is slightly reduced, so in the next step of the embodiment, the voltage of each parallel-connected battery core set in the battery module is determined whether reaches the nominal voltage (step S732). Once the nominal voltage is reached, the charging current is reduced by a level again (step S733). Finally, it is determined whether the electric power of the battery module is fulfilled (step S740). If yes, the charging of the battery module is stopped (step S750). Or, if not, the steps of reducing the charging voltage level and determining the voltage of the parallel-connected battery core set are repeated until the electric power of the battery module is full.

Through the method of controlling the charging voltage, at the initial stage of charging, the constant current charging is adopted, and changed to the constant voltage charging when the voltage passing through the battery module reached the nominal voltage. In this manner, it is possible to provide sufficient charging current for the battery module with taking the safety of the battery module into account, thereby achieving the function of quick charging.

To sum up, the method for charging the battery module of the present invention has at least the following advantages.

1. Through monitoring the voltage of each parallel-connected battery core set in the battery module, the charging parameters of the system are controlled.

2. It is guaranteed that the voltage of each parallel-connected battery core set does not exceed the nominal voltage, thereby meeting the safety requirement.

3. The charging power source is utilized effectively to change the charging curve, so as to achieve the purpose of quick charging.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for charging a battery module, applied to a battery module including a plurality of parallel-connected battery core sets connected in series, comprising:
   a. adjusting a charging current applied to the battery module to charge the battery module with a constant current;
   b. determining whether a voltage of any one of the parallel-connected battery core sets of the battery module reaches a nominal voltage;
   c. if the voltage of the any one of the parallel-connected battery core sets reaches the nominal voltage, adjusting the charging current applied to the battery module to charge all of the parallel-connected battery core sets, wherein the charging currents of the parallel-connected battery core sets are equal to each other;
   d. determining whether a voltage of any remaining one of the parallel-connected battery core sets reaches the nominal voltage; and
   e. if the voltage of the any remaining one of the parallel-connected battery core sets reaches the nominal voltage, proceeding to charge all of the parallel-connected battery core sets with another adjusted current until another parallel-connected battery core set reaches the nominal voltage.

2. The method for charging the battery module as claimed in claim 1, wherein before the step a., the method further comprises:
   performing a trickle charge on the battery module; and
   determining whether the voltage of the battery module reaches a charge initial voltage, and starting to charge the battery module with the constant current when the voltage of the battery module reaches the charge initial voltage.

3. The method for charging the battery module as claimed in claim 1, wherein after the step b., the method further comprises:
   if the voltages of all of the parallel-connected battery core sets do not reach the nominal voltage, returning to the step a. to proceed charging the battery module with the constant current.

4. The method for charging the battery module as claimed in claim 1, wherein in the step c., the step of adjusting the charging current applied to the battery module to charge all of the parallel-connected battery core sets comprises:
   c1. reducing the charging current supplied to the battery module by a level;
   c2. determining whether the voltage of any one of the parallel-connected battery core sets of the battery module reaches the nominal voltage;
   c3. when the voltage of one of the parallel-connected battery core sets reaches the nominal voltage, reducing the charging current supplied to the battery module by the level; and
   c4. repeating the steps c2. and c3. so as to charge the battery module with a constant voltage.

5. The method for charging the battery module as claimed in claim 1, wherein the nominal voltage is a maximum voltage endured by the parallel-connected battery core sets during safe operation.

6. The method for charging the battery module as claimed in claim 1, wherein the voltage of the parallel-connected battery core set when being charged with a constant voltage is the nominal voltage.

7. The method for charging the battery module as claimed in claim 1, wherein each parallel-connected battery core set comprises at least one cell.

8. The method for charging the battery module as claimed in claim 1, wherein after the step e., the method further comprises:
   determining whether the electric power of the battery module is fulfilled.

9. The method for charging the battery module as claimed in claim 8, wherein the step of determining whether the electric power of the battery module is fulfilled comprises:
   determining whether the current passing through the battery module is smaller than a minimum current;
   if the current passing through the battery module is smaller than the minimum current, determining the electric power of the battery module is full; and
   if the current passing through the battery module is greater than the minimum current, determining the electric power of the battery module is not full.

* * * * *